Nov. 18, 1924.

C. W. MORTIMER 1,516,238

METHOD OF CUTTING SHINGLE STRIPS

Filed Feb. 1, 1922

INVENTOR

Charles W. Mortimer

Patented Nov. 18, 1924.

1,516,238

UNITED STATES PATENT OFFICE.

CHARLES W. MORTIMER, OF BROOKLYN, NEW YORK, ASSIGNOR TO THE BARRETT COMPANY, A CORPORATION OF NEW JERSEY.

METHOD OF CUTTING SHINGLE STRIPS.

Application filed February 1, 1922. Serial No. 533,226.

*To all whom it may concern:*

Be it known that I, CHARLES W. MORTIMER, a citizen of the United States, residing at Brooklyn, in the county of Kings and State of New York, have invented certain new and useful Improvements in Methods of Cutting Shingle Strips, of which the following is a specification.

In the art of manufactured roofing it is old to form strips of roofing material having tabs along the edge that is to be exposed for the purpose of simulating the appearance of individual shingles when the strips are installed on a roof. On account of the expansion and contraction due to weather conditions it is impracticable to make the strips of very great length, thus necessitating that the strips be laid in horizontal rows with the ends abutting and thus leaving a joint that must be protected from leakage. This requires the successive layers to be overlapped so that about 250 square feet of material is required to cover 100 square feet of roof.

By the present invention a considerable saving is effected by providing shingle strips of such shape that a greater proportion of material is provided near the joints, or one end of the strip is made wider so as to provide better protection for the joints that occur in horizontal rows. The shingle strips will be installed so as to break the joints along the wider portions of the shingle strips.

The invention will be understood from the description in connection with the accompanying drawings, in which—

Figure 1:
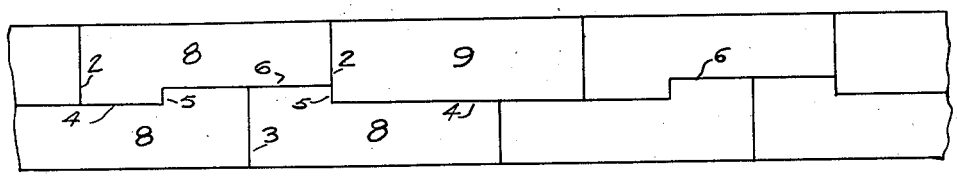

Fig. 1 is a plan view showing how the shingle strips are cut from a sheet of roofing material.

Figure 2:
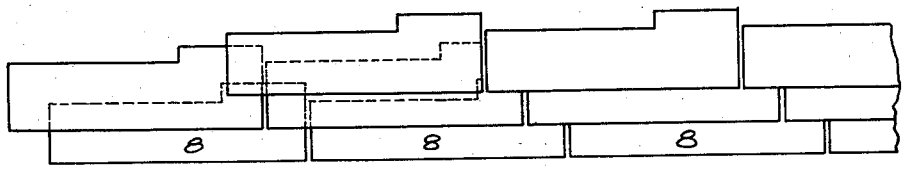

Fig. 2 indicates the way the shingle strips are installed on a roof.

In Fig. 1 of the drawings a sheet 1 of roofing material is indicated and is so cut along the lines 2, 2 etc., the lines 3, 3 etc., the lines 4, 4 etc., the lines 5, 5 etc. and the lines 6, 6 etc. that with a sheet of roofing material as wide as the sum of the narrow and the wide portion of a shingle strip, sets of shingle strips consisting of three shingle strips 8, 8, 8 of the same size and shape are produced by this invention, and one shingle strip 9 is also cut out of the sheet of roofing material the same shape as those heretofore known.

In cutting the roofing sheet 1 along the lines 2—6, the individual strips 8 will be so formed that the narrow portion is twice as long as the wider portion of each strip 8. This can be done by making the cuts along the lines 4 twice the length of the cuts along the lines 6 and by spacing the lines 2 on one side of the sheet 1 a distance apart equal to three-fourths of the length of the lines 4, beginning one-fourth the distance from the end of one of the lines 4, and by spacing the lines 3 along the other side of the sheet 1 the same distance apart, beginning at the middle point of the lines 6. The length of the lines 2 should preferably be about one-fourth the length of the narrow portion of the strips. In this way there is no waste of material due to cutting out the shingle strips. Instead of having the roofing sheet 1 the width indicated, the same may be two or more times this width without any waste of material.

As a specific example, it may be mentioned that with a roofing sheet 1 of a width of 18 inches, the cuts may be made along lines so that the narrow end of the strips is 8 inches and the wider end 10 inches in width, while the length of the narrow portion may be two-thirds of 32 inches and the length of the wider portion one-third of 32 inches, making the shingle strips each 32 inches long. The straight edges of the strips that are to be exposed to the weather may be provided with notches, or in case roofing material of the ordinary kind with mineral surfacing layers thereon is used, the portions 8 to be exposed may be ornamented in various ways to improve the appearance, such for example as by heating with a hot implement along certain lines to bring the asphalt through the stone surfacing, or by pressing with an implement while the asphalt is hot, or by applying small strips at proper intervals, or by providing stone surfacing of different colors in streaks thereacross, or by printing with different colors, etc.

When the shingle strips are installed, the first row will be laid, as indicated in Fig. 2, with the wider ends all turned in one direction, the next horizontal row may be overlapped so as to expose one-half the width of the narrow portion, the joints of the second row being spaced from the joints of the first row a distance equal to one-half the length of the wider portions of the shingle strips, and so on continuously to cover the roof, an auxiliary layer being, of course, laid under the first row as is usual to begin at the eaves.

By making the ends of the strips wider, as indicated, the most dangerous part with regard to leakage, namely the joints, is rendered safe and 13⅓% of material is saved with the dimensions above enumerated.

I claim:—

1. The process which comprises cutting two sets of parallel slits longitudinally of a sheet of roofing material, said sets being staggered and one set substantially twice as long as the other.

2. The process which comprises cutting two series of parallel slits longitudinally of a sheet of roofing material, said respective series being offset from each other and the slits of one series being substantially twice as long as those of the other.

3. The process which comprises cutting two series of parallel slits longitudinally of a sheet of roofing material, said respective series being offset from each other and the slits of one series being substantially twice as long as those of the other, and cutting said sheet transversely along lines spaced apart distances equal to the average length of said slits.

4. The process which comprises cutting two series of parallel slits longitudinally of a sheet of roofing material, said respective series being offset from each other and the slits of one series being substantially twice as long as those of the other, and cutting said sheet transversely along lines spaced apart distances equal to the average length of said slits, said lines on one side intersecting the middle of said slits.

5. The process which comprises cutting two sets of parallel slits longitudinally of a sheet of roofing material substantially half way between two parallel straight edges of said strip, said sets of slits being staggered, and one set being substantially twice as long as the other.

In testimony whereof I affix my signature.

CHARLES W. MORTIMER.